US011996573B1

(12) United States Patent
Paczkowski et al.

(10) Patent No.: US 11,996,573 B1
(45) Date of Patent: May 28, 2024

(54) ELECTRICAL POWER STORAGE SUBSYSTEM

(71) Applicant: Bren-Tronics, Inc., Commack, NY (US)

(72) Inventors: Henry Paczkowski, Manhasset Hills, NY (US); Peter J. Burke, East Northport, NY (US); Daniel Sha, Farmingdale, NY (US)

(73) Assignee: Bren-Tronics, Inc., Commack, NY (US)

( * ) Notice: Subject to any disclaimer, the term of this patent is extended or adjusted under 35 U.S.C. 154(b) by 81 days.

(21) Appl. No.: 17/452,256

(22) Filed: Oct. 26, 2021

Related U.S. Application Data (60) Provisional application No. 63/106,310, filed on Oct. 27, 2020.

(51) Int. Cl.
*H01M 50/213* (2021.01)
*H01M 10/613* (2014.01)
*H01M 10/643* (2014.01)
*H01M 10/6563* (2014.01)

(52) U.S. Cl.
CPC ....... *H01M 50/213* (2021.01); *H01M 10/613* (2015.04); *H01M 10/643* (2015.04); *H01M 10/6563* (2015.04)

(58) Field of Classification Search
CPC ............. H01M 50/213; H01M 10/613; H01M 10/643; H01M 10/6563
See application file for complete search history.

(56) References Cited

FOREIGN PATENT DOCUMENTS

| KR | 20170019212 A | * | 2/2017 | .......... H01M 10/627 |
| WO | WO-2010148224 A2 | * | 12/2010 | ........ H01M 10/5057 |
| WO | WO-2019057656 A1 | * | 3/2019 | .......... H01M 10/052 |

* cited by examiner

*Primary Examiner* — Jimmy Vo
(74) *Attorney, Agent, or Firm* — Keusey & Associates, P.C.

(57) ABSTRACT

A power storage cartridge for placement in a stack with other cartridges arranged along a stack axis. The cartridge is a a rack-mountable housing including an active battery module and a passive heat sink module having cooling air circulating throughout both modules. The active module includes battery cells and cell support systems disposed within an airtight compartment having two ducts. The passive environmental management module is sealed to the active module around said ducts. Cooling fans circulate air between the active module and the passive environmental management module through the two ducts.

26 Claims, 6 Drawing Sheets

ELECTRICAL POWER STORAGE SUBSYSTEM

CROSS REFERENCE TO RELATED APPLICATIONS

This application claims the benefit under 35 U.S.C. § 119(e) from U.S. Provisional Patent Application No. 63/106,310 entitled Electrical Power Storage Subsystem filed on Oct. 27, 2020.

GOVERNMENT LICENSE RIGHTS

This invention was made with government support under contract DOTC-19-01-INIT0267 awarded by NSWCDD. The government has certain rights in the invention.

BACKGROUND OF THE INVENTION

1. Field of the Invention

The invention relates to an electrical power storage subsystem.

2. The Prior Art

Large scale battery storage systems are used to capture energy from solar panels, wind turbines and other sources. These applications typically involve low rate charging and engagement of the batteries. The batteries can be spaced to isolate one from another in the case of a thermal event. In addition, the spacing allows adequate room for battery cooling.

For land-based industrial lasers, such as used for sheet metal cutting, electrical mains are utilized to provide the required high wattage. However, laser directed energy weapons require significantly more power during target engagement than available 5 times) from the platform's electrical system. Therefore, an energy storage subsystem that charges from the platform's available power can be used to supply the very high power level required when firing the laser. Typical laser engagement duration is from one to sixty seconds.

Lithium ion (Li-Ion) batteries provide a practical solution since they have high energy density and are capable of providing the very high discharge rates required at high efficiency. Instead of utilizing a large monolithic battery, a distributed battery approach consisting of a number (e.g., 23) of identical battery modules provides many advantages, including flexibility in packaging on the platform, as well as growth potential for higher power lasers by adding more modules.

Each energy storage module must typically provide 10 kW of power to its associated fiber laser module. Even though lithium ion chemistry has the highest efficiency, each module will dissipate about 800 watts during laser activation, requiring a practical thermal management solution. The cell temperature cannot exceed 80° C. to prevent the over-temperature protection electronics from disconnecting the load to ensure safe operation.

Safety is an important consideration for a high energy battery to be installed on an aircraft, ship, or land vehicle. Although thermal runaway of a lithium ion cell is improbable due to redundant protective circuits included in the Battery Management System, the cells utilize an intumescent material structure to prevent cell failure propagation to adjacent cells. Additionally, appropriate venting is provided to direct and channel hot gases out of the module and platform in case of a cell energetic event.

SUMMARY OF THE INVENTION

Accordingly, it is an object of an embodiment of the invention to provide a large scale battery system that meets weight, size and safety requirements for use on an aircraft, ship or other platform.

It is a further object to provide a battery module capable of delivering on the order of 10 kW for a duration of 1 to 60 seconds.

It is another object to provide a bank of distributed battery modules with sufficient power to operate a laser weapon system.

It is a further object to provide a thermal management system for the battery bank. This includes packaging the battery cells in a heat absorbing material that reacts endothermically when burned. The heat absorbing material may be an insulating material or an intumescent material.

It is another object to seal the common internal volume of the battery module and heat exchanger to protect personnel and adjacent equipment.

It is a further object to provide venting for hot gas leakage in the case of a thermal event.

These and other related objects are achieved by an embodiment of the invention comprising a power storage cartridge for placement in a stack with other cartridges arranged along a stack axis. The power storage cartridge is configured as a rack-mountable housing having an active battery module and a passive heat sink modules collectively sealed in a compartment with cooling air circulating between them. The active module includes battery cells and a cell support systems disposed within an airtight compartment having two ducts. The heat sink is contained within a passive environmental management module that is sealed to said active module around said ducts. Cooling fans circulate air between said active module and said passive environmental management module through the two ducts.

The passive environmental management module includes a heat sink having a plurality of cooling fins arranged parallel to a fin axis. The cooling fans include an inflow cooling fan that draws air from the passive environmental management module through one of the ducts into the active module. The outflow cooling fan that draws air from said active module through the other one of the ducts into said passive environmental management module. The cooling fans circulate air through the cooling fins along the fin axis in a direction from the outflow cooling fan to the inflow cooling fan that is orthogonal to the stack axis. The cooling fans circulate air between the active module and the passive environmental management module in a loop encompassing a circulating plane that includes the fin axis and is orthogonal to the stack axis.

The passive environmental management module includes an overpressure relief port that vents heat and smoke from a faulty battery cell out of the housing in a vent direction that is orthogonal to the stack axis and is orthogonal to the fin axis. The active module includes insulation made from intumescent material surrounding said battery cells to absorb heat from a faulty battery cell. A group of battery cells are contained with an upper and a lower end cap that are arranged on the battery cells along the stack axis to prevent an explosive thermal event from damaging an adjacent cartridge. The housing is oriented so that the overpressure relief port is at the top of the passive environmental management module.

The active module includes Lithium ion battery cells grouped into cell packs to collectively produce about 10 kW of output power within 1 to 60 seconds. The cell support systems comprise a battery cell charger and cell monitoring electronics. The cell support systems combine about 8 kW of battery cell power and 2 kW of charger power to produce about 10 kW of output power within 1 to 60 seconds. The active module includes a first exterior housing wall and electrical connectors sealingly mounted in said first housing wall. The electrical connectors provide operative coupling for charging power input, engagement power output, CAN-bus diagnostics and Ethernet communications.

The Lithium ion battery cells are grouped into a first pair of cell packs and a second pair of cell packs. The cell support system include a first charger and a second charger. The first pair of cell packs are disposed between the first exterior housing wall and the first charger; and the second charger is disposed between the first exterior housing wall and the second pair of cell packs. The housing further includes a baffle in the active module between said first pair of cell packs and said second pair of cell packs dividing an interior space into two portions. The baffle is spaced from the first exterior housing wall to direct air to circulate from the inflow cooling fan towards said first exterior housing wall. One pair of cell packs is spaced and oriented so that an axis of the inflow cooling fan extends between the one pair of cell packs. The other pair of cell packs is spaced and oriented so that an axis of the outflow cooling fan extends between the other pair of cell packs.

The passive environmental management module includes a second exterior housing wall with an inner surface having said plurality of cooling fins mounted thereto and an outer surface adapted to contact a cold plate. The second exterior housing wall is adapted to thermally couple said plurality of cooling fins to the cold plate. The passive environmental management module includes an overpressure relief port disposed in the second exterior housing wall that is adapted to vent heat and smoke from a faulty battery cell out of the housing into an exhaust manifold behind the cold plate. The passive environmental management module includes a removable desiccant pack. The heat sink is disposed between said overpressure relief port and said desiccant pack along the fin axis. The second exterior housing wall is made from a highly conductive, corrosion-resistant metal. A silicone gasket forms the seal between the active module and the passive environmental module.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENTS

Figure 1:
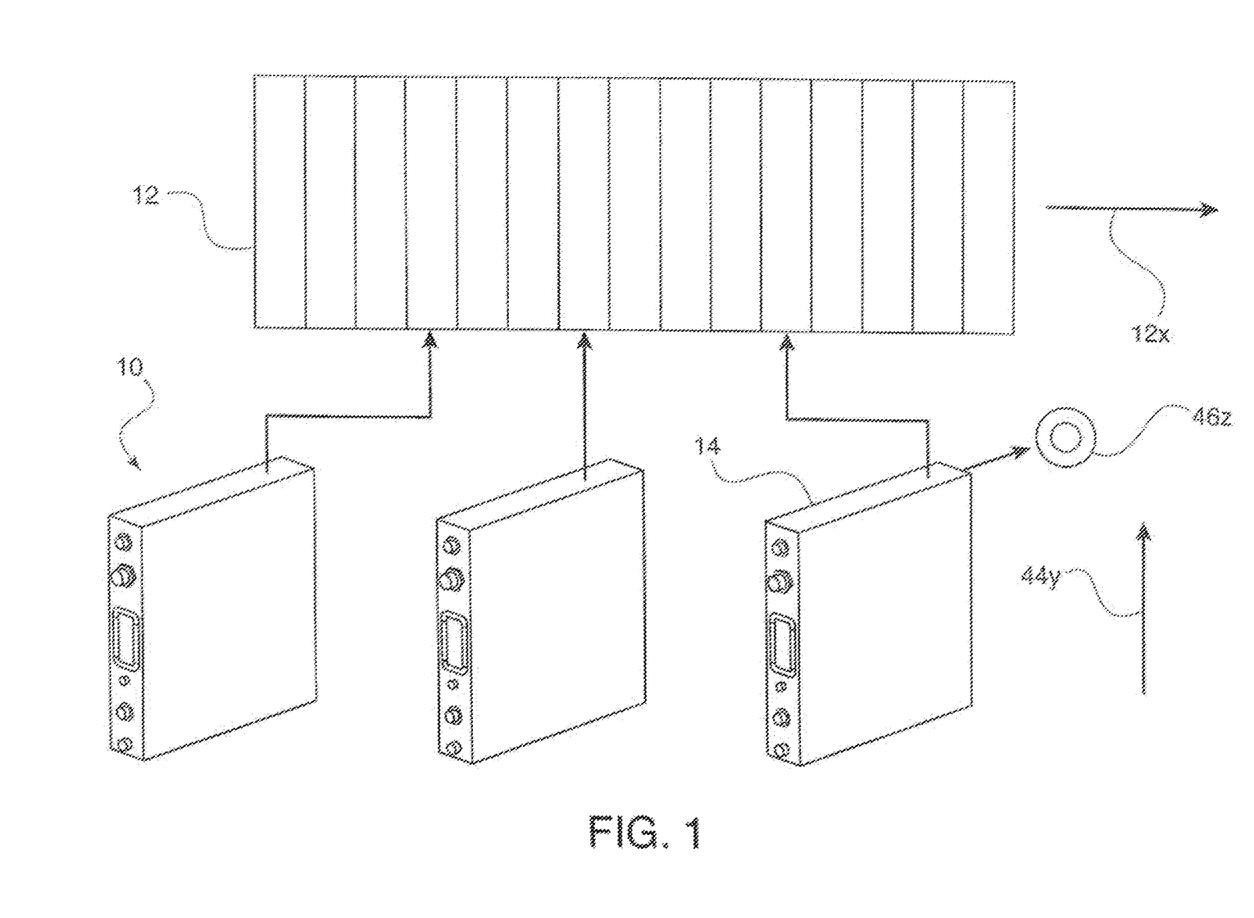
FIG. 1 is a schematic view of a power storage cartridge for placement in a stack.

These and other related objects are achieved according to an embodiment of the invention by an electrical power storage subsystem (EPSS) having battery modules and thermal management. More particularly the EPSS, as shown schematically in FIG. 1, is a power storage cartridge 10 for placement in a stack 12 with other cartridges arranged along a stack axis 12*x*. The power storage cartridge 10 is configured as a rack-mountable housing 14 functioning as a component part that can be installed into the stack and easily removed for testing, maintenance or replacement. The housing is designed as a narrow rectangular case that is installed into bays of the stack. The connectors, indicators, fuses and all other electrical controls are located on the front housing panel along with a handle. The connectors include charging power input, engagement power output, CANbus diagnostics connector and Ethernet communications. The rear housing panel supports a heat sink having parallel fins oriented parallel to a fin axis 44*y* and includes an overpressure relief port that vents heat and smoke in a vent direction 46*z*.

Figure 2:
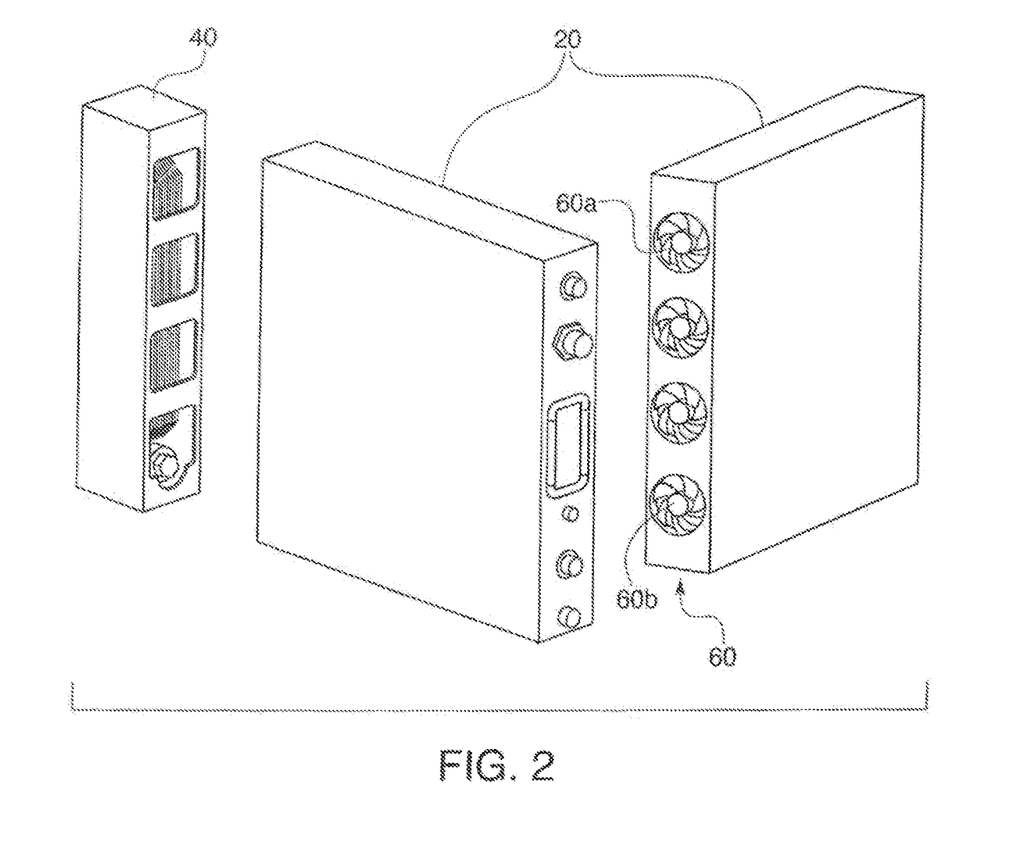
FIG. 2 is a perspective view of a passive environmental management module heat exchanger and two active battery modules and cooling fans according to an embodiment of the invention.

The housing includes an active battery module 20, a passive environmental management module 40 and cooling fans 60 to circulate air between the active battery module and the passive environmental management module. FIG. 2 shows the passive environmental management module 40 removed from the housing along with front and rear views of the active battery module 20. Cooling fans 60 include an inflow cooling fan 60*a* that draws cooled air from the passive environmental management module 40 into the active battery module 20. An outflow cooling fan 60*c* draws heated air from the active battery module 20 into the passive environmental management module 40. The cooling fans may consist of one inflow cooling fan and one outflow cooling fan. In the drawing, two smaller inflow cooling fans and two smaller outflow cooling fans are depicted. Other types and quantities of cooling fans may be provided.

Figure 3:
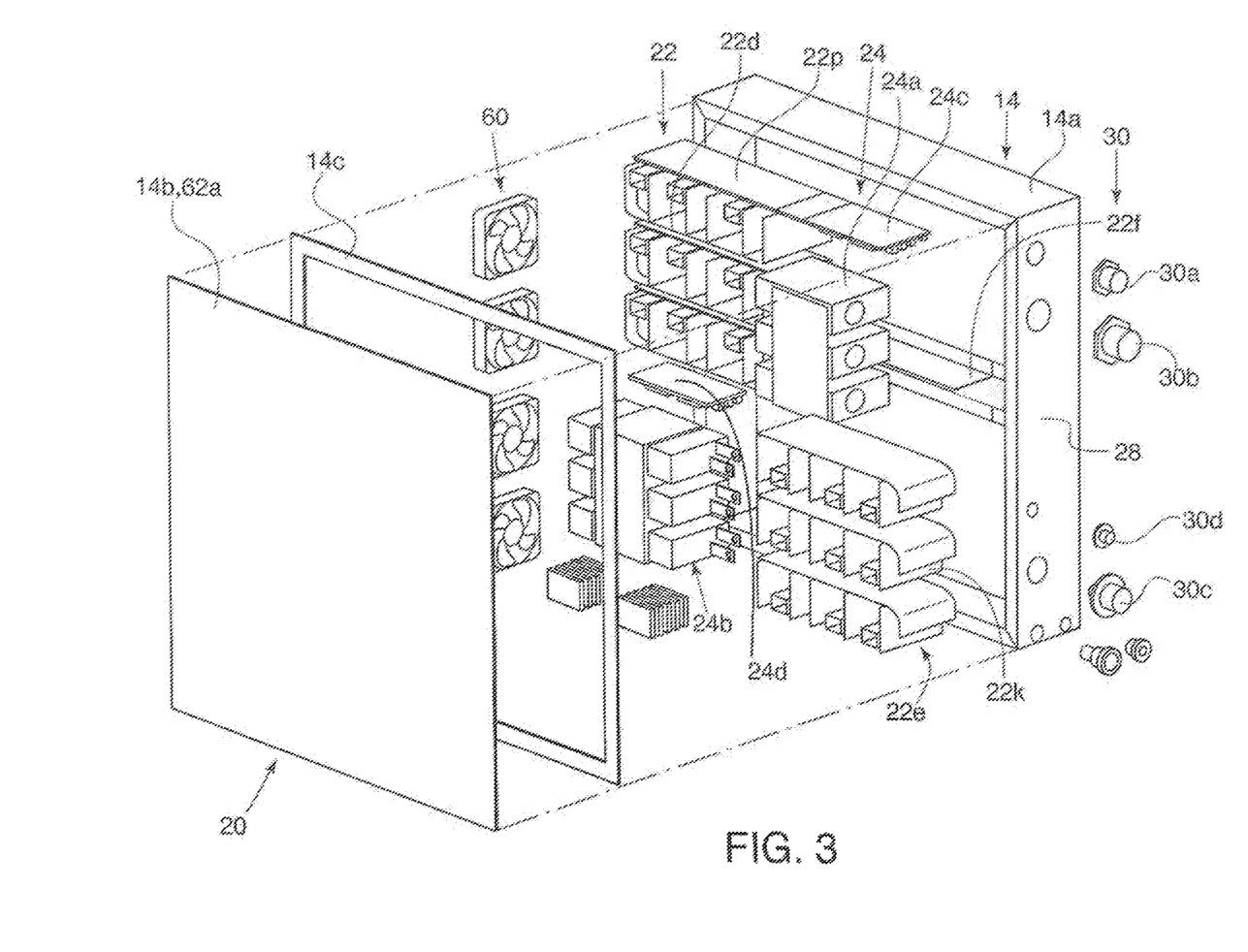
FIG. 3 is an exploded view illustrating the active battery module components.

An exploded view of active battery module 20 is shown in FIG. 3. The battery cells 22 are combined into cell packs. Each active battery module includes one or more chargers and one or more cell support systems. In the case of two sets, the placement of the battery cell packs and its associated chargers are staggered so that in the top half of module 20, the charger and cell pack are arranged front to back and in the bottom half of module 20 the cell pack and charger are arranged front to back. The battery (cell) packs are disposed in opposite corners to maximize spacing between them. Accordingly, when the cell packs are discharged the heat generated by them is distributed at the diagonal corners of module 20. By corollary, when the chargers are operating, the heat generated by them is distributed at the other diagonal corners of module 20.

In the illustrated embodiment, there are three chargers and three battery cell packs on the top half, with three additional battery cell packs and three additional chargers on the bottom half. For the sake of simplicity, a detailed description of the active battery module contents will be provided for two cell packs rather than three. A first pair of cell packs 22*d* has an associated cell support system 24 comprising a first charger 24*a* and a first set of cell monitoring electronics 24*c*.

A protective plate 22p protects cell fire and explosion from escaping out through the top of housing 14. A baffle 22f extends from the back (left) wall of the housing toward the first exterior wall 28, and terminates to provide a gap between the baffle and the first exterior wall 28. The baffle 22f protects cell fire and explosion from spreading through housing 14. A second pair of cell packs 22e has an associated cell support system 24 comprising a second charger 24b and a second set of cell monitoring electronics 24d. Additional protect plates may be positioned around components within the active battery module. The battery cells are arranged within cell crates 22k, for example, one set of cells within one crate to form one cell pack. The cell crate provides additional containment of cell fire and explosion, and further protects from the enclosed cells from other cell fire and explosion. One cooling fan 60, for example, an inflow cooling fan is oriented to direct cooling air in between two cell packs. Another cooling fan, for example, an outflow cooling fan is oriented to draw cooling air from between the other two cell packs.

The components are installed within a five-sided box-like housing tray 14a, that is covered with a housing lid 14b and sealed with a housing sealing gasket 14c. The first exterior wall 28 includes a handle and electrical connectors 30. The connectors include high voltage power connectors and low voltage monitoring and communications connectors. A charging power input 30a draws power from the craft electrical bus, and when such mains power is A.C. the input power is coupled to the chargers. The chargers operate as an A.C. to D.C. rectifier to charge the battery cells. An engagement power output 30b delivers energy from the battery cells of the power storage cartridge. Additional connectors include a CANbus diagnostics connector 30c and an Ethernet communications connector 30d. As can be seen in FIGS. 2 and 3, the cartridge is sealed except for the overpressure relief port. High voltage battery connections and low voltage communications connections are all located on the front panel. Accordingly, when the cartridge is mounted into the rack, no electrical connections are made, just thermal contact between the back plate and the exterior cold plate of the platform or craft.

Figure 4:
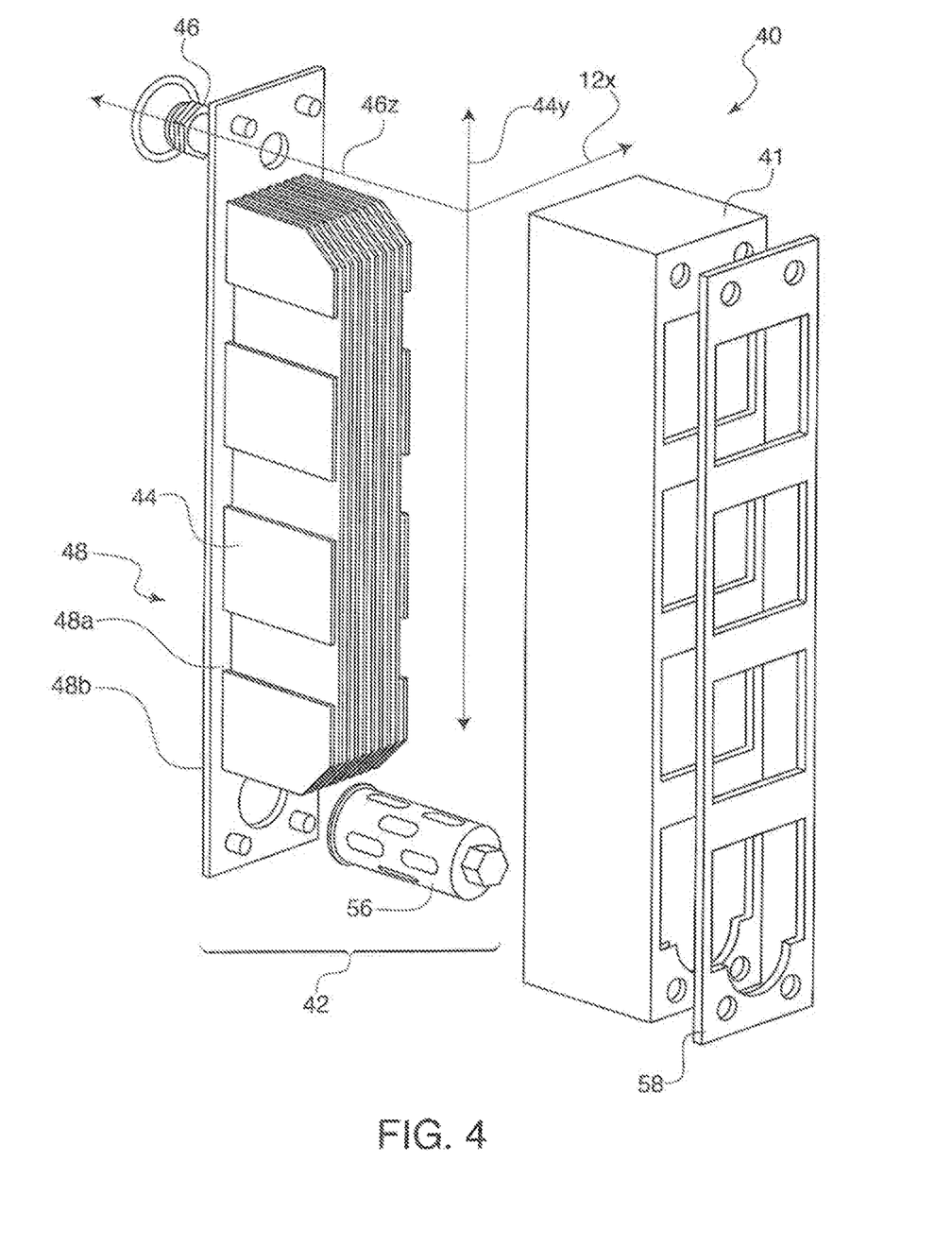
FIG. 4 is an exploded view illustrating the passive environmental management module heat exchanger components.

An exploded view of a passive environmental management module 40 is shown in FIG. 4. When assembled, the passive environmental management module 40 is attached to the back wall of the active battery module 20. A gasket 58 seals the passive environmental management module 40 to the back wall of the active battery module 20. A cover 41 is provided with one port for each duct/fan. The cover further attaches to a heat sink 42 comprised of a third exterior wall 48 and cooling fins 44. The third exterior wall 48 includes an inner surface an inner surface 48a and an outer surface 48b. The fins are mounted parallel to each other on the inner surface 48a and aligned to a fin axis 44y. An overpressure relief port 46 is formed in third exterior wall 48 that vents heat and smoke from a faulty battery cell out of module 40 in a vent direction 46z. The housing is placed in a stack arranged along a stack axis 12x. A Cartesian coordinate system having three mutually perpendicular coordinate axes is formed by the stack axis 12x, the fin axis 44y, and the 46z.

In a practical embodiment, one passive environmental management module or heat exchanger is provided for each bay in the stack. Component wise, one heat exchanger is provided as for each battery module. The heat exchanger has the same length and width dimensions as the rear panel of the battery module. The heat exchanger consists of the fins coupled to the third exterior wall which functions as a conductive panel. Within the internal volume, there is also provided a desiccant for moisture control. In a practical embodiment, the desiccant pack 56 is mounted to the third exterior wall 48 inside the heat exchanger. During maintenance when the heat exchanger is removed for inspection, the pack can be easily removed and replaced with a new one. A cover extends over the heatsink and includes on its front panel one aperture for each of the exhaust ports of the battery module. A gasket extends around the periphery of the front panel, and surrounds each aperture. When the battery module is plugged in, the internal space of the battery module is sealed to the internal space of the heat exchanger. The internal space of the battery module is in communication via the apertures to the internal space of the heatsink.

In a practical embodiment, four exhaust fans were provided on the rear panel of the battery module. The corresponding heat exchanger included four gasketed apertures. The fins of the heatsink extend from the first aperture to the fourth aperture. This allows air to flow from one aperture to the next though the channels disposed between adjacent fins. The first two fans pull air from the battery module into one half of the heat exchanger. The second two fans push air from the second half of the heat exchanger into the battery module. Thus a circulatory flow is established within the battery module. The circulatory flow from the heat exchanger crosses three battery packs, three chargers, three further battery packs, and three further chargers before passing back into the heat exchanger. Internal baffling and component placement optimize air flow across the battery packs and control electronics. The battery module includes a gasket between the case and the cover to minimize hot gas leakage in the case of a thermal event.

Figure 5:
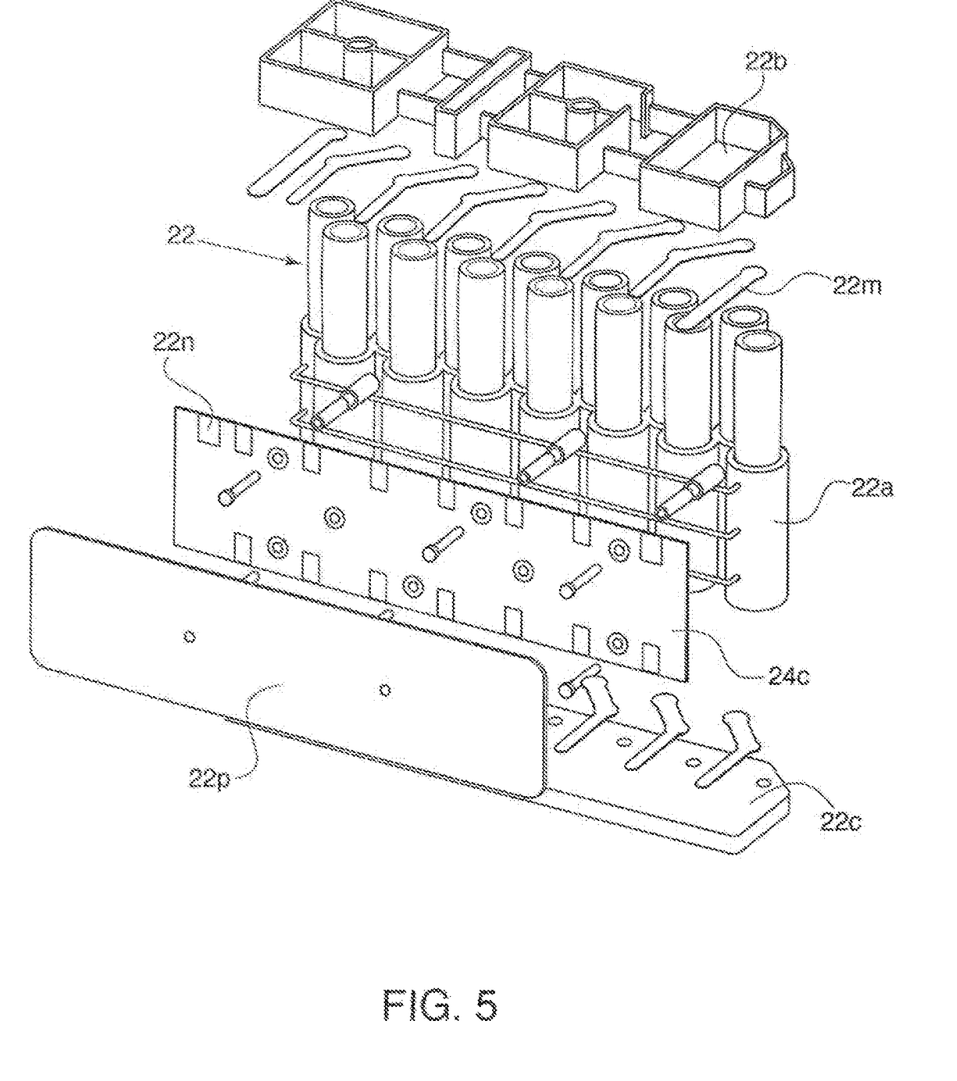
FIG. 5 is an exploded view of the battery cell pack components.

The battery packs are shown in greater detail in FIG. 5. Cylindrical cells 22, for example Lithium-Ion (Li-Ion) cells, are encased in an insulating material 22a. In a practical embodiment, an intumescent material is employed to surround the cells and absorb heat through conduction. When exposed to high heat or flame, the intumescent material undergoes an endothermic reaction to further absorb heat through its chemical reaction. The insulated cells are electrically coupled to each other and to a circuit board containing control electronics. Metal straps or contacts 22m couple cells to each other and extend outwardly from the cell pack, and fold down for soldering to conductive (brass) pads 22n on the circuit boards. The circuit board comprises a first set of cell monitoring electronics 24c. The control electronics monitor cell status along with cell charging and cell balancing among other tasks. Data generated by the control electronics is communicated to the overall system controller by the CANbus diagnostics connector.

The cells are packaged within crates and end caps including an upper end cap 22b and a lower end cap 22c. The end caps contain explosive debris from ejecting out of the top or bottom of the cells. Additionally, protective panels or plates 22p serve to protect adjacent battery modules, other equipment and personnel from cell malfunction such as explosive thermal events. The panels further serve as baffles to direct air flow around the cells. When plugged into the rack, the rear panel of the battery module is placed in contact with a heat exchanger. Since there are no rear or hidden connections, the battery modules can be installed and removed without tools, although manually operated latches or locking arms may be provided adjacent the front panel to prevent unintended dislodging. The heat exchanger is mounted to a cold plate. The laser weapon may include a cold plate within the laser support structure. The heat exchanger may extend across one or more battery bays.

Figure 6:
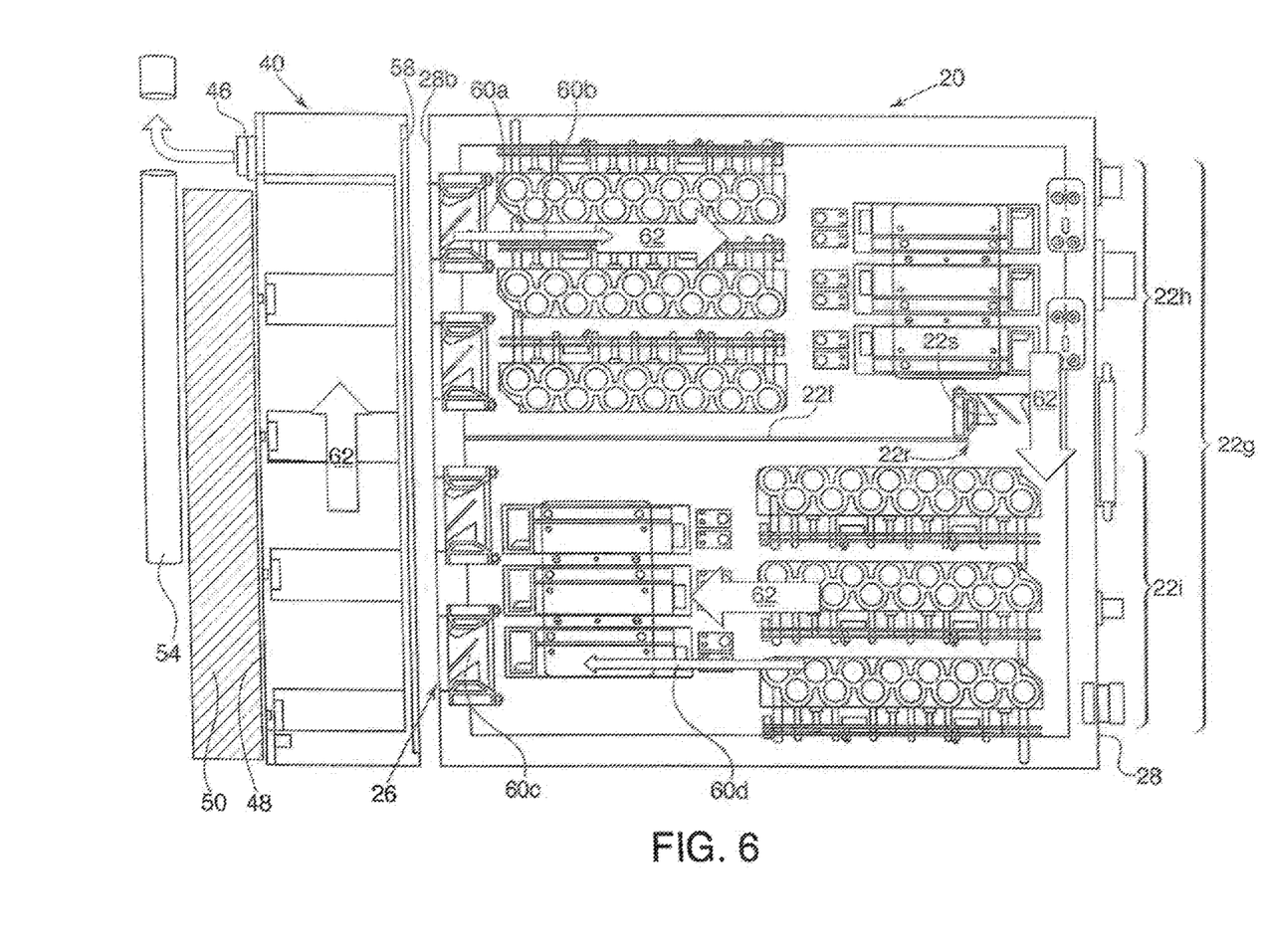
FIG. 6 is plan view showing the active battery module and passive environmental management module heat exchanger in the installed configuration.

The third exterior wall 48 functions as a conductive panel which is placed adjacent a cold plate 50 as shown in FIG. 6. The internal volume of the battery module is in communication with the internal volume of the heat exchanger, with the internal volumes sealed against leakage into the room where personnel are present. The heat exchanger is cooled by having its rear conductive panel in thermal contact with the cold plate. The rear conductive panel and heatsink fins are made from metal. Cooling the rear conductive panel also cools the heatsink fins, since the fins are mounted directly on the inside of the rear conductive panel.

The internal volume of the battery module and heat exchanger are sealed to each other with a gasket 58. This internal fixed volume requires pressure venting in the case of a thermal event to avoid the build up of explosive pressure. Accordingly, the heat exchanger is provided with a duct that communicates from the sealed internal volume to an external vent via piping. The piping may be provided with a check valve to prevent warm external air from entering the heat exchanger or plenum. The heat exchanger includes an overpressure relief port 46 to duct hot gas venting in the case of a thermal event. Relief port 46 is in communication with an exhaust manifold 54 disposed behind the cold plate 50. Within the internal volume, there is also provided a desiccant for moisture control. The panels in combination with the housing are designed to channel any hot gases and direct them along the air flow circulatory path out the back of the battery module into the heat exchanger where they can be exhausted through the vent. In summary, heat management is provided by the insulating material encasing the cells in addition to baffles and housing configuration designed to direct air flow through the heat exchanger.

Laser directed energy weapons require significantly more power during target engagement than available 5 times) from the platform's electrical system. Therefore, an energy storage subsystem that charges from the platform's available power can be used to supply the very high power level required when firing the laser. Typical laser engagement duration is from one to sixty seconds. Lithium ion (Li-Ion) batteries provide a practical solution since they have high energy density and are capable of providing the very high discharge rates required at high efficiency. Instead of utilizing a large monolithic battery, a distributed battery approach consisting of a number (e.g., 23) of identical battery modules provides many advantages, including flexibility in packaging on the platform, as well as growth potential for higher power lasers by adding more modules. Each energy storage module must typically provide 10 kW of power to it's associated fiber laser module. Even though lithium ion chemistry has the highest efficiency, each module will dissipate about 800 watts during laser activation, requiring a practical thermal management solution.

Under normal conditions the cell temperature will be maintained below their 80° C. operating threshold. The cell monitoring system can control the chargers to vary the rate of charging based on temperature and other factors. Under low temperature conditions, the cell monitoring system can operate the chargers at full capacity. In one embodiment full capacity charging is at 2 kW. As the cell monitoring system detects the temperature approaching 80° C. is can lower the charging rate accordingly. At the low end charging is about one-fifth the full rate, for example, as low as 350 watts. After laser discharge depletes the batteries, the cell monitoring system will attempt to operate the chargers at full capacity, and will lower the charging rate to balance charge rate with heat generation which effects the temperature. In the event the cell temperature exceeds its operating threshold, the over-temperature protection circuit portion of the control electronics will disconnect the load to ensure safe operation. The cell monitoring system will also reduce the charging rate as the battery packs near full charge. For each power storage cartridge, the cell monitoring system can provide engagement power output from the batteries alone, or from a combination of batteries and chargers. For example, to provide 10 kW of engagement power the cell monitoring system can draw 8 kW from the battery packs and supplement this with 2 kW from the chargers.

The first exterior wall 28 includes at least one duct 26 in the upper half for an inflow cooling fan and at least one duct 26 in the lower half for an outflow cooling fan. The inflow cooling fan 60*a* rotates about an inflow cooling fan axis 60*b* that extends between two battery packs. If three battery packs are present, two inflow cooling fans would be provided to introduce cooling air into the space between two adjacent battery packs, respectively. The outflow cooling fan 60*c* rotates about an inflow cooling fan axis 60*d* that extends between two battery packs. If three battery packs are present, two outflow cooling fans would be provided to draw cooling air from the space between two adjacent battery packs, respectively. A baffle 22*f* extends from the back wall 28*b* toward first exterior wall 28. The baffle is spaced from first exterior wall 28 thereby providing a gap 22*r*. An optional supplemental fan 22*s* may be disposed in the gap 22*r*. The baffle divides the interior space 22*g* into a first interior space portion 22*h* and a second interior space portion 22*i*. The inflow cooling fan introduces cooling air into the first interior space portion 22*h*. The cooling air then flow along the first exterior wall 28. The cooling air is then drawn out by outflow cooling fan through second interior space portion 22*i*. The cooling air is then circulated from bottom to top through passive environmental management module 40. The cooling air thus flow around a loop 62 through ducts 26 within a sealed internal space comprising the active battery module 20 and the passive environmental management module 40. The loop 62 includes a circulating plane 62*a* that is parallel to housing lid 14*b* (FIG. 3). Circulating plane 62*a* is co-planar to fin axis 44*y* and vent direction 46*z*. Circulating plane 62*a* is orthogonal to stack axis 12*x*.

For certain applications, the electronic components may be coated to provide conformal protection against moisture, chemicals or other corrosive agents. The module case and internal components are designed to reduce the risk of cell failure propagation to other cells within the case and to other cells in adjacent cells.

Having described preferred embodiments (which are intended to be illustrative and not limiting) for materials, configurations and folding options, it is noted that modifications and variations can be made by persons skilled in the art in light of the above teachings. The battery modules can contain different quantities of battery packs and corresponding chargers. The internal sealed volume, cooling fans and circulatory flow between the battery module and heat exchanger can be configured in a variety of ways. The heat exchanger and battery module can be combined into a single unit. Cooling of the heat exchanger and venting can be accomplished by different means. It is therefore to be understood that changes may be made in the particular embodiments of the invention disclosed which are within the scope and spirit of the invention.

What is claimed is:

1. A power storage cartridge for placement in a stack with other cartridges arranged along a stack axis comprising:
   a rack-mountable housing including:

an active module having battery cells and cell monitoring electronics disposed within an airtight compartment having two ducts;

a passive environmental management module that is sealed to said active module around said ducts to form a sealed rack-mountable housing;

an overpressure relief port adapted to vent heat and smoke from a faulty battery cell out of the sealed rack-mountable housing; and cooling fans for circulating air between said active module and said passive environmental management module through said two ducts.

2. The power storage cartridge of claim 1, wherein said passive environmental management module includes a heat sink having a plurality of cooling fins arranged parallel to a fin axis.

3. The power storage cartridge of claim 2, wherein said cooling fans comprise:

an inflow cooling fan that draws air from said passive environmental management module through one of the ducts into said active module; and an outflow cooling fan that draws air from said active module through the other one of the ducts into said passive environmental management module.

4. The power storage cartridge of claim 3, wherein said cooling fans circulate air through said cooling fins along the fin axis in a direction from said outflow cooling fan to said inflow cooling fan that is orthogonal to the stack axis.

5. The power storage cartridge of claim 4, wherein said cooling fans circulate air between said active module and said passive environmental management module in a loop encompassing a circulating plane that includes the fin axis and is orthogonal to the stack axis.

6. The power storage cartridge of claim 2, wherein said passive environmental management module includes a second exterior housing wall with an inner surface having said plurality of cooling fins mounted thereto and an outer surface adapted to contact a cold plate, wherein said second exterior housing wall is adapted to thermally couple said plurality of cooling fins to the cold plate.

7. The power storage cartridge of claim 1, further comprising a silicone gasket which forms the seal between the active module and the passive environmental module.

8. A power storage cartridge for placement in a stack with other cartridges arranged along a stack axis comprising:

a rack-mountable housing including:

an active module having battery cells and cell support systems disposed within an airtight compartment having two ducts;

a passive environmental management module that is sealed to said active module around said ducts and includes (i) a heat sink having a plurality of cooling fins arranged parallel to a fin axis and (ii) an overpressure relief port that vents heat and smoke from a faulty battery cell out of the housing in a vent direction that is orthogonal to the stack axis and is orthogonal to the fin axis; and an inflow cooling fan that draws air from said passive environmental management module through one of the ducts into said active module and an outflow cooling fan that draws air from said active module through the other one of the ducts into said passive environmental management module, wherein said cooling fans circulate air through said cooling fins along the fin axis in a direction from said outflow cooling fan to said inflow cooling fan that is orthogonal to the stack axis and wherein said cooling fans circulate air between said active module and said passive environmental management module in a loop encompassing a circulating plane that includes the fin axis and is orthogonal to the stack axis.

9. The power storage cartridge of claim 8, wherein said active module includes insulation made from intumescent material surrounding said battery cells to absorb heat from a faulty battery cell.

10. The power storage cartridge of claim 8, further including an upper and a lower end cap arranged on said battery cells along the stack axis to prevent an explosive thermal event from damaging an adjacent cartridge.

11. The power storage cartridge of claim 8, wherein said housing is oriented so that said overpressure relief port is at the top of said passive environmental management module.

12. The power storage cartridge of claim 8, wherein said active module includes Lithium ion battery cells grouped into cell packs to collectively produce about 10 kW of output power within 1 to 60 seconds.

13. The power storage cartridge of claim 8, wherein said cell support systems comprise a battery cell charger and cell monitoring electronics, and wherein said cell support systems combine about 8 kW of battery cell power and 2 kW of charger power to produce about 10 kW of output power within 1 to 60 seconds.

14. The power storage cartridge of claim 11, wherein said active module includes a first exterior housing wall and electrical connectors sealingly mounted in said first housing wall.

15. The power storage cartridge of claim 11, wherein said electrical connectors provide operative coupling for charging power input, engagement power output, CANbus diagnostics and Ethernet communications.

16. The power storage cartridge of claim 13, wherein said Lithium ion battery cells are grouped into a first pair of cell packs and a second pair of cell packs; and wherein said cell support system include a first charger and a second charger; and wherein the first pair of cell packs are disposed between the first exterior housing wall and the first charger; and wherein the second charger is disposed between the first exterior housing wall and the second pair of cell packs.

17. The power storage cartridge of claim 16, further including a baffle disposed in said active module between said first pair of cell packs and said second pair of cell packs dividing an interior space of said active module into two portions, wherein the baffle is spaced from said first exterior housing wall to direct air to circulate from said inflow cooling fan towards said first exterior housing wall.

18. The power storage cartridge of claim 12, wherein one pair of cell packs is spaced and oriented so that an axis of the inflow cooling fan extends between the one pair of cell packs; and wherein the other pair of cell packs is spaced and oriented so that an axis of the outflow cooling fan extends between the other pair of cell packs.

19. A power storage cartridge for placement in a stack with other cartridges arranged along a stack axis comprising:

a rack-mountable housing including:

an active module having battery cells and cell support systems disposed within an airtight compartment having two ducts;

a passive environmental management module that is sealed to said active module around said ducts and includes a heat sink having a plurality of cooling fins arranged parallel to a fin axis, wherein said passive environmental management module includes a second exterior housing wall with an inner surface having said plurality of cooling fins mounted thereto and an outer surface adapted to contact a cold plate, wherein said second exterior housing wall is adapted to thermally couple said plurality of cooling fins to the cold plate, wherein said passive environmental management module includes an overpressure relief port disposed in said second exterior housing wall that is adapted to vent heat and smoke from a faulty battery cell out of the housing into an exhaust manifold behind the cold plate; and cooling fans for circulating air between said active module and said passive environmental management module through said two ducts.

20. A power storage cartridge for placement in a stack with other cartridges arranged along a stack axis comprising:
a rack-mountable housing including:
- an active module having battery cells and cell support systems disposed within an airtight compartment having two ducts;
- a passive environmental management module that is sealed to said active module around said ducts and includes a heat sink having a plurality of cooling fins arranged parallel to a fin axis, wherein said passive environmental management module includes a second exterior housing wall with an inner surface having said plurality of cooling fins mounted thereto and an outer surface adapted to contact a cold plate, wherein said second exterior housing wall is adapted to thermally couple said plurality of cooling fins to the cold plate, wherein said passive environmental management module includes a removable desiccant pack; and
- cooling fans for circulating air between said active module and said passive environmental management module through said two ducts.

21. The power storage cartridge of claim 20, wherein said heat sink is disposed between said overpressure relief port and said desiccant pack along the fin axis.

22. A power storage cartridge for placement in a stack with other cartridges arranged along a stack axis comprising:
a rack-mountable housing including:
- an active module having battery cells and cell support systems disposed within an airtight compartment having two ducts;
- a passive environmental management module that is sealed to said active module around said ducts and includes a heat sink having a plurality of cooling fins arranged parallel to a fin axis, wherein said passive environmental management module includes a second exterior housing wall with an inner surface having said plurality of cooling fins mounted thereto and an outer surface adapted to contact a cold plate, wherein said second exterior housing wall, wherein said second exterior housing wall is made from a highly conductive, corrosion-resistant metal and is adapted to thermally couple said plurality of cooling fins to the cold plate; and
- cooling fans for circulating air between said active module and said passive environmental management module through said two ducts.

23. A power storage cartridge for placement in a stack with other cartridges arranged along a stack axis comprising:
a rack-mountable housing including:
- an active module having battery cells and cell monitoring electronics disposed within an airtight compartment having two ducts;
- a passive environmental management module that is sealed to said active module around said ducts to form a sealed rack-mountable housing; and
- cooling fans for circulating air within the sealed rack-mountable housing between said active module and said passive environmental management module through said two ducts.

24. The power storage cartridge of claim 23, further including an overpressure relief port to vent the sealed rack-mountable housing.

25. The power storage cartridge of claim 24, wherein the sealed rack-mountable housing is adapted to contain gas leakage from the battery cells thereby protecting personnel.

26. The power storage cartridge of claim 25, wherein the passive environmental management module includes an outer wall adapted to contact a cold plate.

* * * * *